US012486152B2

(12) United States Patent
Mellerin et al.

(10) Patent No.: US 12,486,152 B2
(45) Date of Patent: Dec. 2, 2025

(54) BASKET, NOTABLY AERIAL BASKET LIFTING DEVICE

(71) Applicant: MANITOU BF, Ancenis (FR)

(72) Inventors: Francois Mellerin, Ancenis (FR); Steve Charron, Ancenis (FR)

(73) Assignee: MANITOU BF, Ancenis (FR)

( * ) Notice: Subject to any disclaimer, the term of this patent is extended or adjusted under 35 U.S.C. 154(b) by 932 days.

(21) Appl. No.: 17/761,168

(22) PCT Filed: Aug. 17, 2020

(86) PCT No.: PCT/FR2020/051472

§ 371 (c)(1),
(2) Date: Mar. 16, 2022

(87) PCT Pub. No.: WO2021/053280

PCT Pub. Date: Mar. 25, 2021

(65) Prior Publication Data

US 2022/0371870 A1 Nov. 24, 2022

(30) Foreign Application Priority Data

Sep. 17, 2019 (FR) ..................................... 19 10232

(51) Int. Cl.
*B66F 17/00* (2006.01)
*B66F 11/04* (2006.01)

(52) U.S. Cl.
CPC .......... *B66F 17/006* (2013.01); *B66F 11/044* (2013.01)

(58) Field of Classification Search
CPC ............................ B66F 11/044; B66F 17/006
See application file for complete search history.

(56) References Cited

U.S. PATENT DOCUMENTS 4,979,588 A * 12/1990 Pike ...................... B66F 17/006 182/2.11
9,656,845 B2 * 5/2017 Dittus .................. B66F 11/044
(Continued)

FOREIGN PATENT DOCUMENTS

CN 108358136 B * 2/2024 .............. B66F 11/04
FR 3008404 A1 * 1/2015 ............ B66F 17/006
(Continued)

OTHER PUBLICATIONS

International Search Report dated Dec. 14, 2020.
Chinese Office Action dated Feb. 11, 2023.

*Primary Examiner* — Colleen M Chavchavadze
(74) *Attorney, Agent, or Firm* — IPSILON USA, LLP

(57) ABSTRACT

Basket (1) comprising: a platform (7), a drive system (2) for moving the platform (7), a control desk (3) equipped with controls (4) of the system (2), a flexible safety link (5), two retaining systems (6) for keeping the link (5) in a position in which the link (5) extends across the platform (7), a detection device for detecting deformation of the link (5), having a detection member configured so that, under the effect of deformation of the link (5), it passes from a state referred to as inactive, in which operation of the controls (4) of the drive system (2) for moving the platform (7) is not disabled to a state referred to as active, in which said operation is disabled, one of the retaining systems (6) comprising a rotary member for winding the link (5) equipped with a return member for returning said rotary member in the direction of winding of the link (5) around said rotary member.

10 Claims, 6 Drawing Sheets

(56) References Cited

U.S. PATENT DOCUMENTS

| | | | | |
|---|---|---|---|---|
| 9,676,602 | B2 * | 6/2017 | Cummings | B66F 11/046 |
| 12,077,418 | B2 * | 9/2024 | Hao | B66F 11/044 |
| 2009/0260920 | A1 | 10/2009 | Cummings | |
| 2018/0134534 | A1 * | 5/2018 | Wicklund | B66F 11/044 |

FOREIGN PATENT DOCUMENTS

| | | | | |
|---|---|---|---|---|
| JP | H0465299 | | 6/1992 | |
| JP | 2017075005 | A * | 4/2017 | B66F 17/006 |

* cited by examiner

BASKET, NOTABLY AERIAL BASKET LIFTING DEVICE

RELATED APPLICATION

This application is a National Phase of PCT/FR2020/051472 filed on Aug. 17, 2020, which claims the benefit of priority from French Patent Application No. 19 10232, filed on Sep. 17, 2019, the entirety of which are incorporated by reference.

FIELD OF THE INVENTION

The present invention relates to a basket, notably an aerial basket.

It relates in particular to a basket comprising:

- a platform having a position for receiving an operator,
- a system driving movement of the platform,
- a control console borne by the platform and equipped with at least one control of the system driving movement of the platform, that can be manually actuated,
- a flexible safety link,
- two systems for retaining the link, one arranged at one of the ends of the link, the other arranged at the other of the ends of the link, to retain the link in at least one position in which the link extends across the platform, in proximity to the control console, and forms a demarcation line between a part of the position for receiving an operator of the platform and the control console,
- a device for detecting deformation of the link comprising at least one member for detecting deformation of the link, said detection member being configured so that, under the effect of a deformation of the link, it switches from a so-called inactive state in which the operation of the control or controls of the system driving movement of the platform is not prevented to a so-called active state in which the operation of the control or controls is prevented.

DESCRIPTION OF RELATED ART

Baskets, in particular aerial baskets, are well known to those versed in this art as illustrated by the patent FR 2,909,084. In such a basket, there is a risk of injury to the operator placed on the platform when, in controlling the system driving movement of the platform, he or she strikes, on the back of the head or the back, an obstacle, such as a beam, which tends to drive the operator toward the control console, said operator then being sandwiched between the obstacle and the control console with a risk of crushing against the control console. This problem is perfectly well known and solutions implementing a safety cable or bar have already been devised for resolving this problem as illustrated for example in the patents EP 2 794 461 and EP 2 096 078. In practice, such solutions make it possible to stop the movements of the platform when the operator is jammed between the obstacle and the control console. In the abovementioned documents, a cable or bar, positioned in front of the control console, makes it possible, when stressed by the operator, to order stoppage of the platform movement drive generally by deactivation of the controls of the system driving movement of the platform. The stressing of the cable or of the bar can work for example when the operator, standing in front of the control console, is forced to lean toward the control console until a pressure is exerted on the cable. However, because of their design, such solutions present a risk of jamming between the safety cable or bar and the obstacle, once the movement of the platform is stopped.

Objects and Summary

One aim of the invention is to propose a basket whose design makes it possible to limit a risk of jamming of the operator between the flexible safety link and the obstacle once the movement of the platform is stopped without compromising the compactness of the link retaining systems.

To this end, the subject of the invention is a basket comprising:

- a platform having a position for receiving an operator,
- a system driving movement of the platform,
- a control console borne by the platform and equipped with at least one control of the system driving movement of the platform, that can be manually actuated,
- a flexible safety link,
- two link retaining systems, one arranged at one of the ends of the link, the other arranged at the other of the ends of the link, to retain the link in at least one position in which the link extends across the platform and forms a demarcation line between a part of the position for receiving an operator of the platform and the control console,
- a device for detecting a deformation of the link comprising at least one member for detecting a deformation of the link, said detection member being configured so that, under the effect of a deformation of the link, it switches from a so-called inactive state in which the operation of the control or controls of the system driving movement of the platform is not prevented to a so-called active state in which the operation of the control or controls is prevented, characterized in that at least one, preferably each, of the retaining systems comprises a rotary winding member of the link around which the link coupled to said rotary member is partially wound, said rotary member being equipped with at least one elastic return member of said rotary member configured to exert, on said rotary member, a force driving angular movement of the rotary member in the direction of winding of the link around said rotary member. This rotary winding member of the link equipped with an elastic return member, such as a spring, can therefore be moved angularly against the action of the elastic return member in the direction of unwinding of the link of said rotary member under the action of a pressure exerted on the so-called active part of the cable extending between the two retaining systems. By virtue of its design in the form of a rotary member loaded by an elastic return member, the travel of the link can be increased without proportionally increasing the bulk of the retaining system.

According to one embodiment of the invention, the or at least one of the members for detecting a deformation of the link is a member for detecting the angular position of the rotary winding member of the link of one of the retaining systems. It is thus possible to increase the travel of the link without increasing the response time of the detection member. It can in fact be made possible for the detection member to switch from the inactive state to the active state as soon as an angular movement of the rotary winding member of the link resulting from a deformation of the link begins, and consequently to stop any movement of the platform while allowing the rotary winding member of the link to continue its angular movement travel in the direction of unwinding of the link of the rotary winding member, including when the detection member is in the active state. This design therefore offers great flexibility in terms of controlling the stopping of the movement of the platform. The command to stop the platform can for example be made at the start or in the middle of the angular movement range of the rotary winding member of the link resulting from the deformation of the link by pressure exerted on the link without compromising the continued angular movement of the rotary winding member of the link in the direction of unwinding of the link.

According to an embodiment of the invention, the basket comprises a control unit with which the device for detecting a deformation of the link is configured to communicate, this control unit being configured to transmit a command signal to stop the operation of the controls of the system driving movement of the platform as a function of the data received from the detection device.

According to one embodiment of the invention, the or at least one of the members for detecting a deformation of the link is a sensor for detecting the angular position of the rotary winding member of the link of one of the retaining systems by contact with said rotary winding member of the link or without contact, this sensor being linked electrically to the control unit and being configured to send to the control unit an electrical signal as a function at least of the angular position of the rotary winding member of the link of said retaining system. Once again, this design of the member for detecting a deformation of the link makes it possible to act on the movement of the platform as soon as an angular movement of the rotary winding member of the link is detected without compromising the continued angular movement of the rotary winding member of the link in the direction of unwinding of the link of said rotary winding member such that the risk of jamming of the operator between the flexible safety link and an obstacle, once the movement of the platform is stopped, is reduced by virtue of the remaining travel allowing the link to be released.

According to an embodiment of the invention, the basket comprises a system for resetting the operation of the control or controls of the system driving movement of the platform, to the state in which the controls are prevented from operating, this system comprising a reset member that can be actuated manually. The reset member is configured so that, in the actuated state, the system driving movement of the platform is controlled in a predefined manner in order to allow the operator to be released.

According to an embodiment of the invention, the rotary winding member of the link of one of the retaining systems is a pulley wheel borne by a shaft arranged fixed on the platform, said pulley wheel having a rim configured to receive the link coupled by one of its ends to the wheel and the elastic return member of said rotary winding member is a spring, preferably a torsion spring. The elastic return member of said rotary winding member is therefore configured to exert, on the wheel, a force driving rotation of the wheel in the direction of winding of the link around the wheel. A pull on the link in the direction of unwinding of the link from the wheel therefore makes it possible to drive movement of the wheel to which the link is coupled against the return action of the spring on the wheel.

According to an embodiment of the invention, the basket comprises a stop limiting angular movement of the rotary winding member of the link of one of the retaining systems, said stop being configured to limit the angular movement of the rotary member beyond a predetermined movement travel, on the one hand in the state in which the rotary member is driven in the clockwise direction, and on the other hand, in the state in which the rotary member is driven in the counter-clockwise direction. The dual function of the angular stop makes it possible to limit the angular movement of the rotary winding member of the link in all the situations of deformation of the link, this deformation being able to result from a tension of the link for example by pressure exerted on the link by the operator or relaxing of the link, for example should the link break.

According to an embodiment of the invention, the basket comprising a stop limiting angular movement of the rotary winding member of the link of one of the retaining systems, said stop being configured to limit the angular movement of the rotary member at least in the direction of unwinding of the link of said rotary member beyond a predetermined angular movement travel of said rotary member, the member for detecting a deformation of the link is configured so that, under the effect of a deformation of the link, it switches from an inactive state to an active state in an angular position of said rotary winding member of the link other than the or at least one of the angular positions of said rotary winding member of the link corresponding to an end-of-travel position of said rotary winding member embodied by said stop. Thus, as a function of the relative position of the end-of-travel position of the rotary winding member of the link and of the detection member, it is possible to vary the moment at which the stop of movement of the platform is triggered in order to vary the angular movement travel of the rotary winding member remaining after the platform is stopped, and consequently the remaining link travel.

According to an embodiment of the invention, each of the retaining systems comprising a rotary winding member of the link around which the link is partially wound, and an elastic return member formed by a spring with which said rotary member is equipped, and the device for detecting a deformation of the link comprising a member for detecting a deformation of the link formed by a member for detecting the angular position of the rotary winding member of the link of just one of the retaining systems, called main retaining system, the stiffness of the spring with which this main retaining system is equipped is less than the stiffness of the spring with which the other retaining system is equipped. The result thereof is an increased sensitivity of the retaining systems.

According to an embodiment of the invention, the basket is an aerial basket.

BRIEF DESCRIPTION OF THE DRAWINGS

The invention will be well understood on reading the following description of exemplary embodiments, with reference to the attached drawings in which.

DETAILED DESCRIPTION

Figure 1:
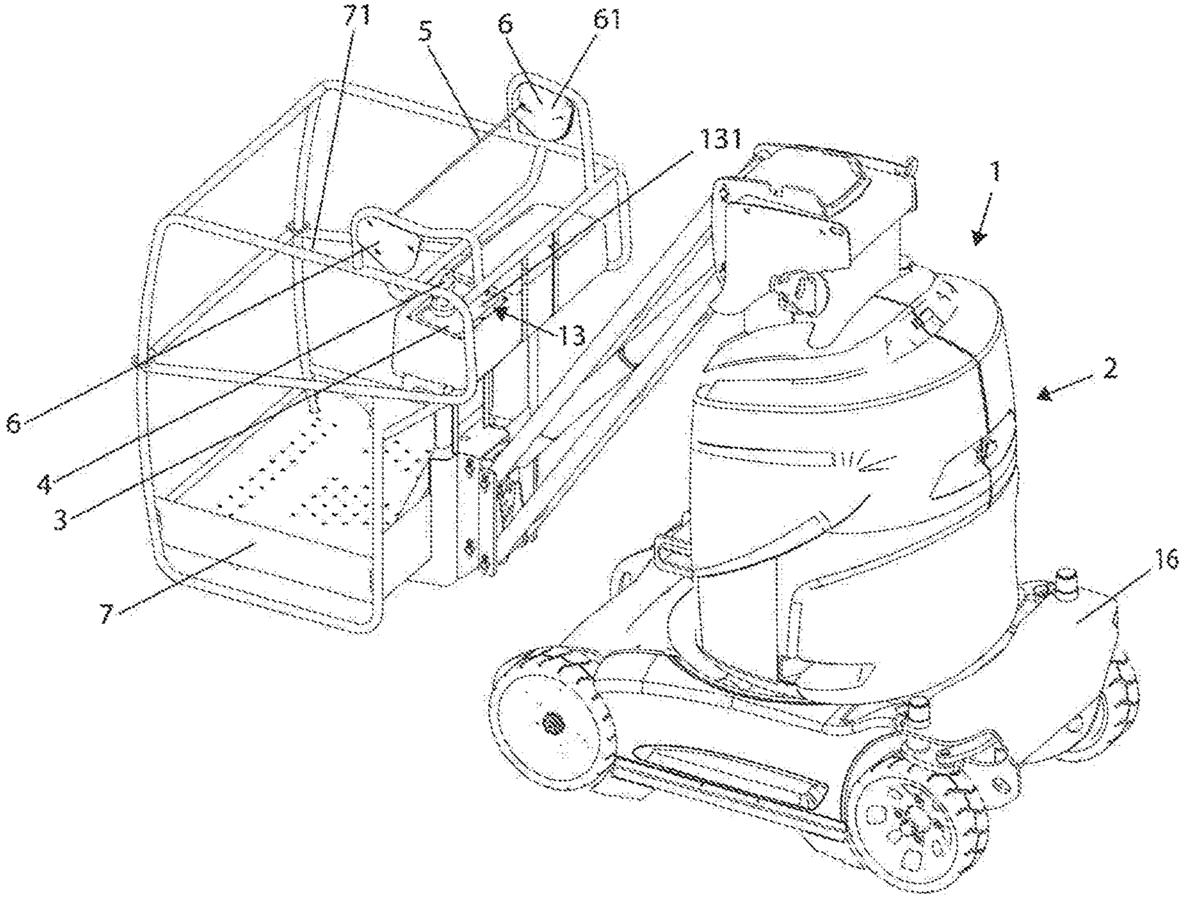
FIG. 1 represents a perspective view of a basket according to the invention when the link is in the unstressed state.

As mentioned above, the subject of the invention is a basket 1 which comprises a platform 7 having a position 71 for receiving an operator 30. This work platform 7 is, here, formed by a floor and guard rails surrounding the floor while allowing access to the interior of said platform. The operator 30 is generally standing inside the receiving position 71 of the platform 7 and faces a control console 3 borne by the platform 7. This control console 3 is generally arranged away from the floor of the platform 7 along the guard rail of the platform 7 as illustrated in FIG. 1. This control console 3 is equipped with at least one, preferably several, manually operable controls 4 such as buttons, levers, or the like. These controls 4 make it possible to control a system 2 driving movement of the platform 7.

This system 2 driving movement of the platform 7 can take a large number of forms depending on the type of basket which can be a suspended basket or one supported by a moving chassis as in the example represented in FIG. 1. In the case of a suspended basket, the system 2 driving movement of the platform 7 can comprise a winch on board said basket and cables for suspending the basket using the winch. The platform 7 can even be driven lift-wise with respect to the supporting chassis 16, as in the example represented in FIG. 1, to form an aerial basket 1.

The chassis 16 is therefore a motorized chassis equipped with wheels or tracks. The platform 7 is linked to the chassis 16 by a lift structure comprising at least one actuator of the lift structure. Actuator and lift structure form a part of the system 2 driving movement of the platform 7. The lift structure here comprises at least one arm pivoting about a horizontal axis and the actuator is a cylinder actuating said arm extending between the arm and the chassis 16. This arm is preferably a telescopic arm.

The controls 4 of the control console 3 make it possible to control the system 2 driving movement of the platform 7 by the actuation of the motor of the chassis 16 and/or at least one actuator of the lift structure to allow a movement of the platform 7 by movement of the chassis 16 on the ground and/or by movement of the arm. This system 2 driving movement of the platform 7 will not be described in more detail because it is well known to those versed in this art.

The basket 1 also comprises a flexible safety link 5 which can be produced in the form of a cable, of a belt, of a chain or the like. In the example represented, the flexible safety link 5 is a cable. This link 5 has two ends represented as 51 in the figures. The basket 1 also comprises two systems 6 for retaining the link 5 borne by the platform 7. These link retaining systems 6 are arranged opposite one another. These retaining systems 6 are, here, borne by two guard rails each delimiting a vertical side of the floor of the platform 7, said sides being opposite.

Figure 2:
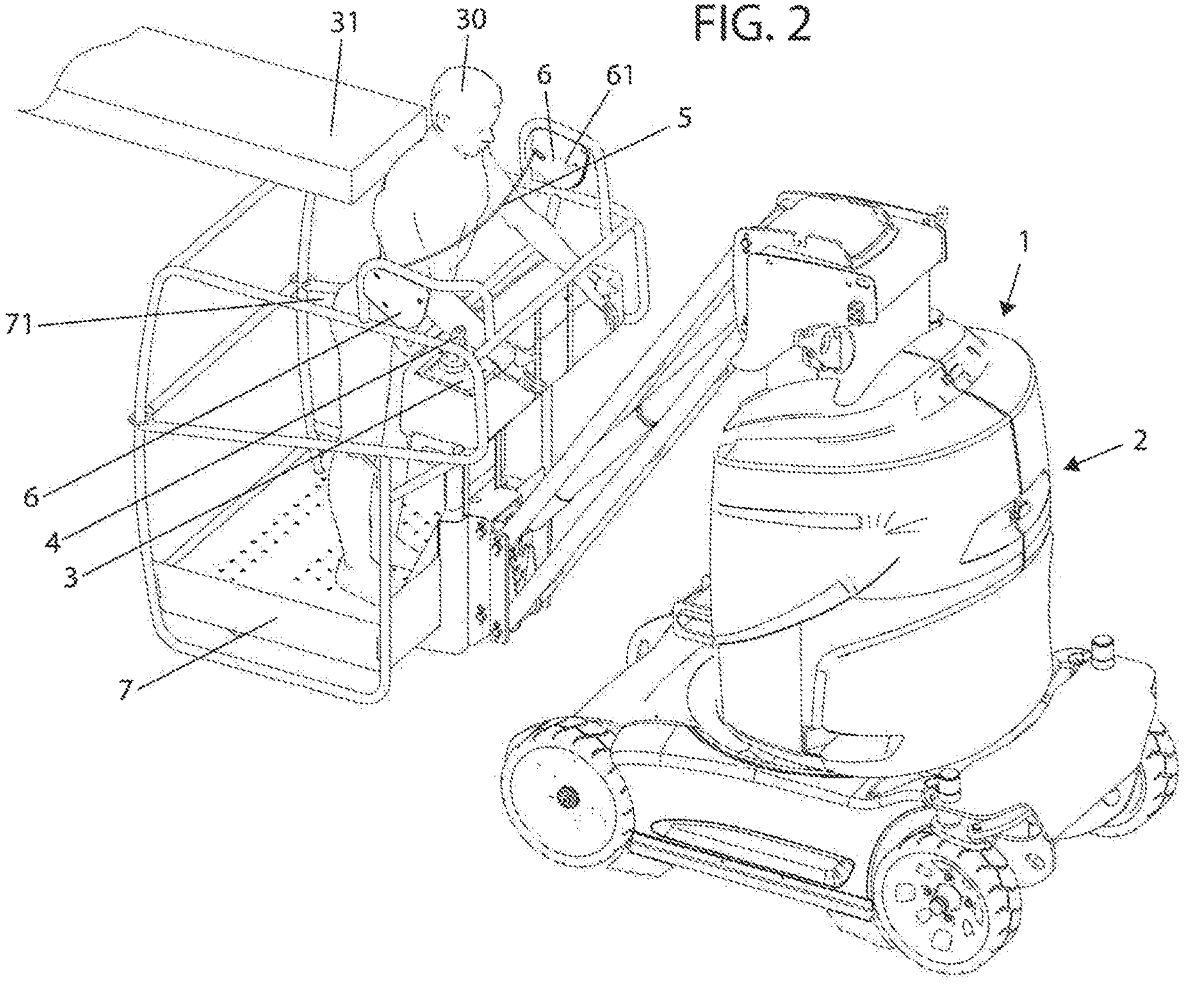
FIG. 2 represents a perspective view of a basket according to the invention when the link is in the stressed state stressed by the operator pushed in the back by an obstacle.

The retaining systems 6 of the link 5 are arranged with one at one of the ends and the other at the other of the ends of the link 5 to retain the link 5 in at least one position in which the link 5 extends, in the taut state, horizontally or substantially horizontally, that is to say to within ±20°. In the taut state, the link 5 thus extends substantially parallel, to within ±20°, to the support plane of the floor of the platform 7. The link 5 extends across the platform 7 in linking, for example as in the examples represented, two opposite vertical sides of the platform juxtaposing the floor of the platform. In practice, this link 5 extends across the platform 7 in proximity to the control console 3 on the trajectory that can be followed by a part of the body, in particular the upper part of the body of an operator standing in front of the control console 3 and leaning toward the control console 3. This link 5 thus forms a demarcation line between a part of the position 71 for receiving the operator of the platform 7 and the control console 3 to be able to be stressed by the operator as soon as the latter is unbalanced forward, for example under the effect of a thrust in the back by an obstacle as illustrated in FIG. 2.

The deformation of the link 5 under the effect of a pressure exerted by the operator on the link 5 results in an increase in the volume of the position 71 that can be occupied by the operator on the platform 7.

The link retaining systems 6 can be identical or different from one retaining system to another. At least one of the retaining systems 6 comprises a rotary winding member 10 of the link 5 around which the link 5, coupled to said rotary member 10, is partially wound. Said rotary member 10 is equipped with at least one elastic return member 11 of said rotary member 10 configured to exert, on said rotary member 10, a force driving angular movement of the rotary member 10 in the direction of winding of the link 5 around said rotary member 10.

In the examples represented, each retaining system 6 comprises a rotary winding member 10 of the link and an elastic return member 11 of the rotary winding member 10 of the link, these elements being each time housed in a housing fixed to the platform.

The rotary winding member 10 of the link is, preferably, as in the examples represented, a pulley wheel 101 borne by a shaft 102 arranged fixed on the platform. The pulley wheel 101 and its shaft 102 are housed at least partially inside the housing borne by the platform 7 when the latter is present. The wheel 101 turns about the shaft 102. This wheel 101 has a rim 103 forming, for example, a groove for receiving the part of the link 5 being wound around the wheel 101. The end 51 of the link is coupled to the wheel 101. To this end, the end 51 of the link 5 can be equipped with a cable stop that fits into a recess of the wheel 101.

The elastic return member 11 of the rotary winding member 10 is, for its part, an elastically deformable member which can take a large number of forms. This return member 11 is produced here in the form of a torsion spring which is wound at least partially around the fixed rotation shaft 102 of the wheel 101. This spring is a kickover spring with two branches linked by a spiral winding wound around the shaft. One of the branches of the spring bears on a fixed stop external to the wheel 101 while the other branch of the spring is coupled to the pulley wheel 101. The branches are elastically returned into position away from one another. Thus, when the link 5 is in the taut state between the two retaining systems 6, a pressure exerted on the link 5 drives angular movement of the rotary winding member 10 of the link 5, that is to say of the wheel 101, in the direction of unwinding of the link from the wheel 101 against the action of the elastic return member 11 which tends, on the contrary, to drive angular movement of the rotary winding member 10 of the link 5 in the direction of winding of the link 5 around said rotary member 10.

To control the angular movement of the rotary winding member 10 of the link 5, the basket 1 comprises a stop 14 limiting angular movement of the rotary winding member 10 of the link 5. This stop 14 here takes the form of a post 141 travelling in a circular guiding path 142 formed on the rotary winding member 10 of the link 5 and with a center radius passing through the axis of rotation of the rotary winding member 10 of the link 5. In the examples represented, this guiding path 142 takes the form of a curved elongate groove closed at each of its ends and inside which the post 141 is arranged in the unstressed state of the link 5 extending in the taut state between the retaining systems 6. In the example represented in FIG. 1 in which the link 5 is not stressed by the operator, the post 141 extends in the guiding path 142 between the ends of the guiding path 142.

Thus, an angular movement of the wheel 101 with respect to the post 141 to a position in which the post 141 is bearing against an end of the guiding path 142 formed on the wheel 101 can be made in both of the directions in which the wheel 101 is driven in movement. The stop 14 is therefore configured to limit the angular movement of the rotary member 10 beyond a predetermined movement travel, on the one hand in the state in which the rotary member 10 is driven in the clockwise direction and on the other hand in the state in which the rotary member 10 is driven in the counter-clockwise direction.

Figure 3:
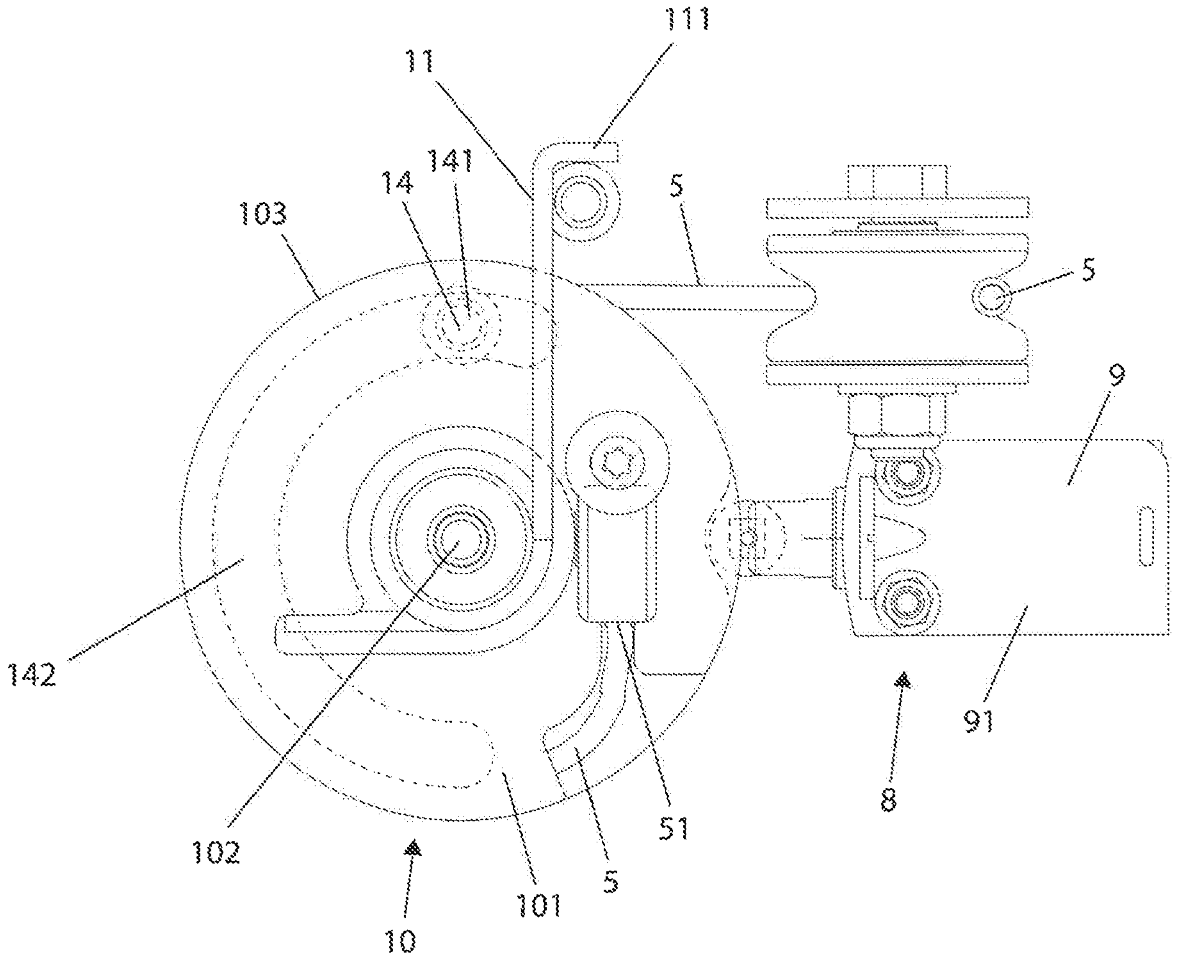
FIG. 3 represents a partial schematic view of a rotary winding member of a link associated with a member for detecting the deformation of the link, when said detection member is in the inactive state corresponding to the unstressed state, that is to say the state in which the link is not deformed.

Thus, the stop 14 serves as end-of-travel stop upon a deformation of the link by pressure exerted on the link 5 or by relaxing of the link 5 when, for example, the link 5 is broken. These two cases are illustrated in FIGS. 4 and 5, FIG. 3 illustrating the position of the post 141 forming the stop 14 when the link 5 is in the unstressed state.

Figure 4:
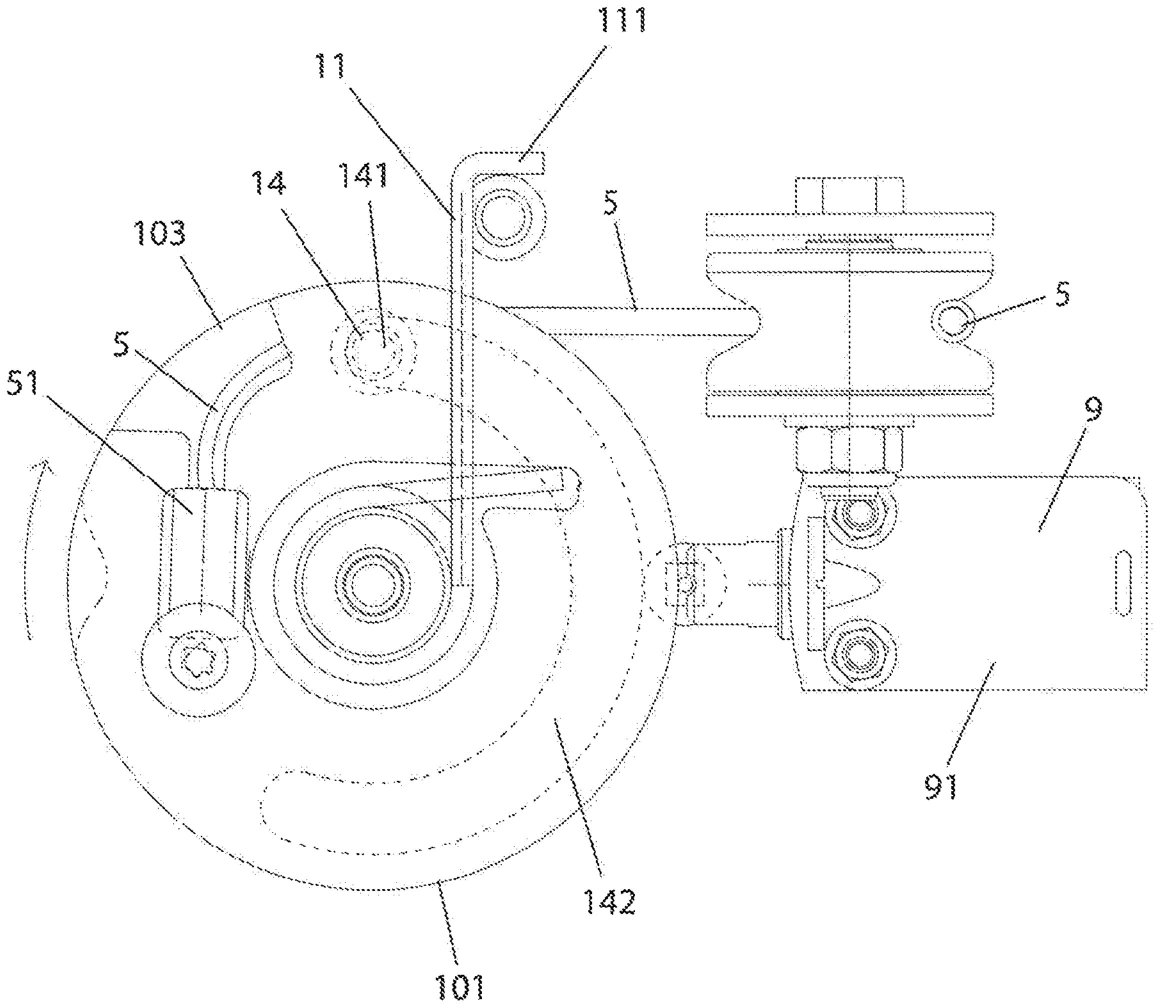
FIG. 4 represents a partial schematic view of a rotary winding member of a link associated with a member for detecting the deformation of the link, when said detection member is in the active state after deformation of the link in the direction of unwinding of the link of said rotary winding member of the link, this deformation being able to result from a pressure exerted by the operator on the link, for example in the case of a situation according to FIG. 2.
Figure 5:
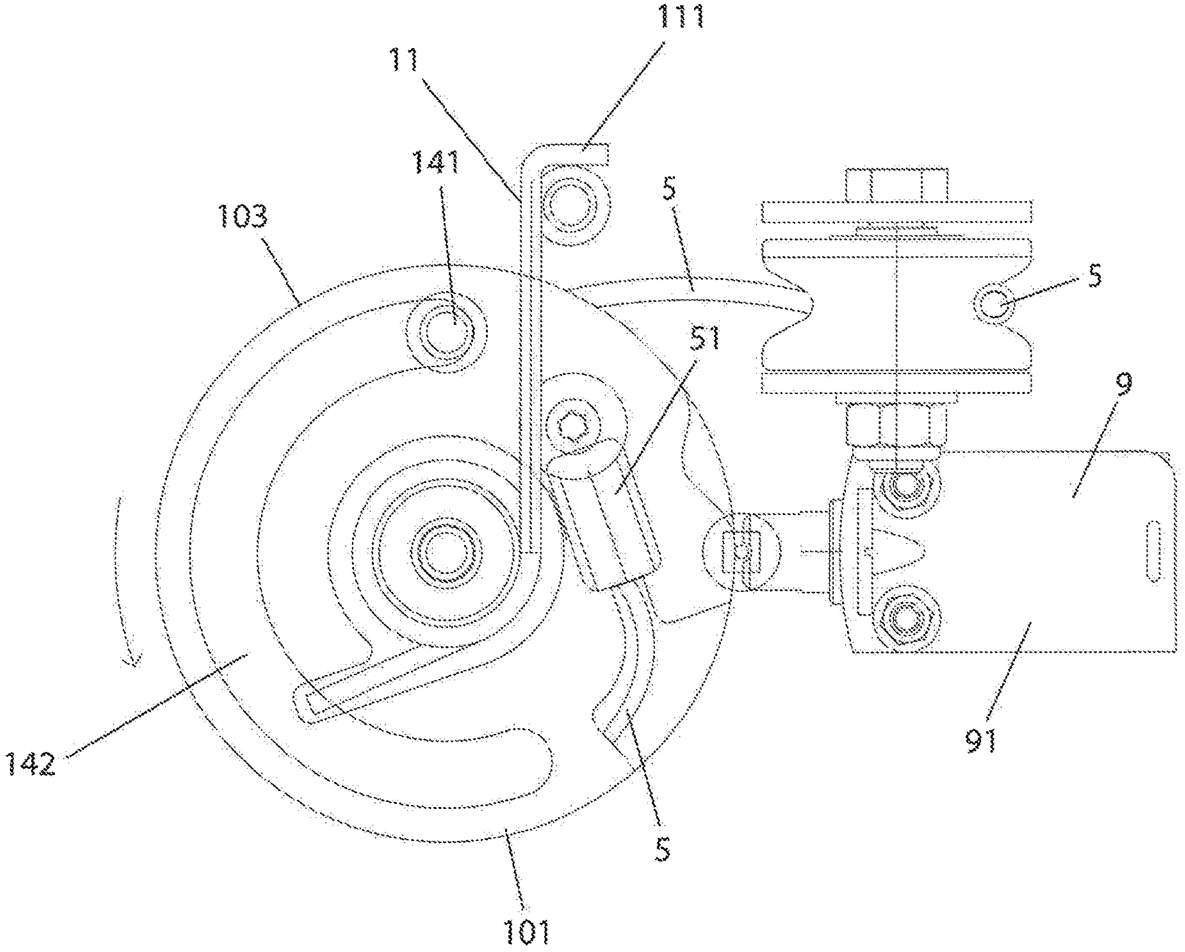
FIG. 5 represents a partial schematic view of a rotary winding member of a link associated with a member for detecting the deformation of the link, when said detection member is in the active state after deformation of the link resulting from the link being broken.
Figure 6:
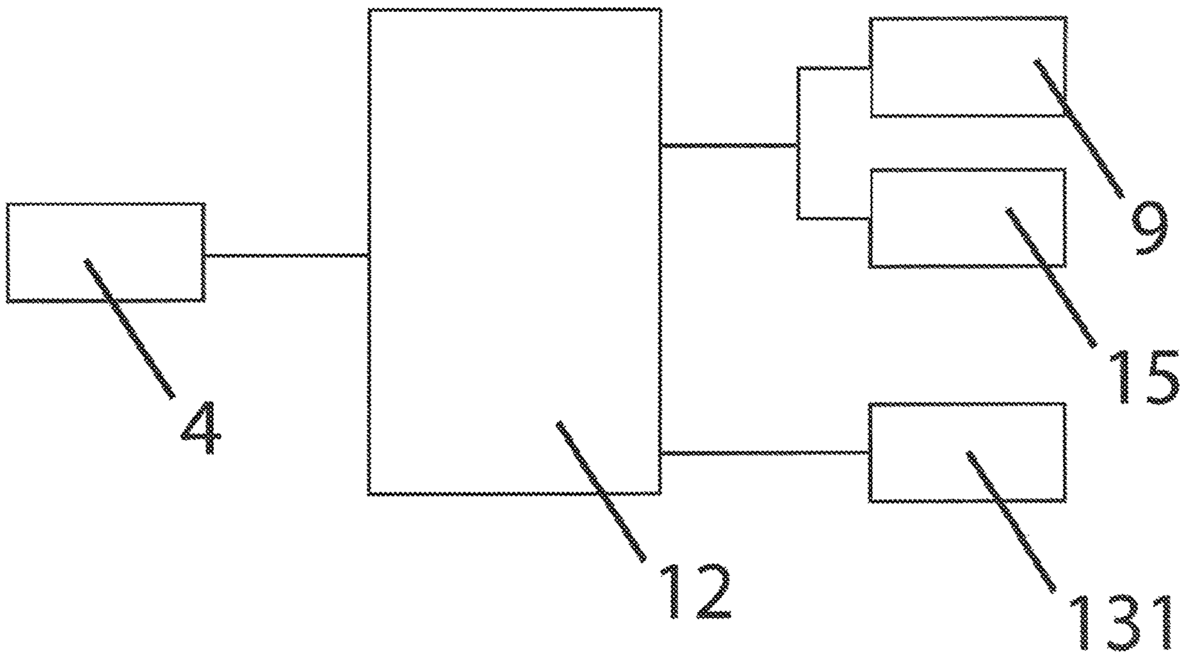
FIG. 6 represents, in block form, a part of the constituent elements of the basket.

Thus, when the link 5 is subjected to a pressure, as in the example represented in FIG. 4, the tension exerted on the link 5 drives an angular movement of the wheel 101 in the clockwise direction in FIG. 4 to a position in which the post 141 is bearing against one of the ends of the guiding path 142. Conversely, when the link 5 is broken and therefore relaxed, as in FIG. 5, the elastic return member 11 tends to drive movement of the wheel 101 in the counter-clockwise direction and the post 141 is then bearing against the opposite end of the guiding path 142.

The basket 1 also comprises a device 8 for detecting a deformation of the link 5. This detection device 8 comprises at least one member 9 for detecting a deformation of the link 5. This detection member 9 is configured so that, under the effect of a deformation of the link 5, it switches from a so-called inactive state in which the operation of the control or controls 4 of the system 2 driving movement of the platform 7 is not prevented, that is to say the manual actuation by the operator of the control or controls 4 allows a control of the system 2 driving movement of the platform, to a so-called active state in which the operation of the control or controls 4 is prevented, that is to say the manual actuation of the control or controls 4 by the operator has no effect on the control of the system 2 driving movement of the platform 7 such that the platform 7 is stopped.

The link between the detection member 9 and the controls 4 to allow a deactivation of the controls 4 in the active state of the detection member 9 can take a large number of forms.

In the examples shown, the basket comprises an emergency stop button 15 with which the control console is equipped. This emergency stop button 15, when actuated by the operator, prevents any electrical power supply notably to the controls 4 of the control console such that the actuation thereof by the operator is ineffective on the system driving movement of the platform 7.

The member 9 for detecting a deformation of the link 5 can behave in the way of an emergency stop button and disable the control or controls 4 in a way similar to that which can be provided in terms of deactivation of the control or controls in the case of an actuation of the emergency stop button 15. In this case, the basket 1 comprises an electrical circuit supplying the controls 4 of the control console and the member 9 for detecting a deformation of the link 5 is configured to open/close said electrical circuit as a function of the angular position of the rotary winding member 10 of the link, said controls 4 being inactive when the circuit is in the open state. The member 9 for detecting a deformation of the link is configured to switch from the inactive state in which it closes the circuit to the active state in which it opens the circuit under the effect of a deformation of the link 5.

In the examples represented, the basket 1 comprises a control unit 12 with which the device 8 for detecting a deformation of the link 5 is configured to communicate. This control unit 12 is configured to transmit a command signal to stop operation of the controls 4 of the system 2 driving movement of the platform 7 as a function of the data received from the detection device 8.

It should be noted that the basket 1 can comprise an audible and/or visual warning device and the control unit 12 can also be configured to transmit a warning signal, that is to say a visual and/or audible alert signal as a function of the data received from the device 8 for detecting a deformation of the link 5, in a manner that is known per se.

The control unit 12 is an electrical and/or computing system. Said control unit comprises, for example, a processor or controller, or dedicated electronic components or components of FPGA or ASIC type. It is also possible to combine computing parts and electronic parts. The control unit 12 can be at least partially common with a computer of the basket associated with the control console.

The functions, means and steps described for the control unit 12 can be implemented in computer program form or via hardware components (for example programmable gate arrays) implemented in, and/or forming part of, said control unit 12. The computer programs or computing instructions can be contained in program storage devices, for example computer-readable digital data storage media or executable programs. The programs or instructions can also be executed from program storage peripheral devices.

In the examples represented, the member 9 for detecting a deformation of the link 5 is a member for detecting the angular position of the rotary winding member 10 of the link 5 of one of the retaining systems 6. This member 9 for detecting the angular position of the rotary winding member 10 of the link 5 can take a large number of forms. This member 9 for detecting the angular position of the rotary winding member 10 of the link 5 can be a sensor 91 for detecting the angular position of the winding member 10 of the link 5 by contact with said rotary winding member 10 of the link 5 as in the example represented, or the sensor is of push-button type with a moving part. The moving part of this sensor is, when the sensor is in the inactive state, positioned in a notch formed on the outer circumference of the wheel 101 of the rotary winding member 10 of the link.

The angular movement of the wheel 101 drives, by bearing contact of the edge of the wheel 101 with the moving part formed by the push button of the sensor, a movement of said moving part of the sensor and the switching of said sensor from an inactive state to an active state in which it can either open the electrical circuit, as described above, or send a signal to the control unit according to its design.

As a variant, the sensor 91 for detecting the angular position of the rotary winding member 10 of the link can be a detection sensor without contact with the rotary winding member 10 of the link 5. This sensor can, in this case, be a distance or proximity sensor such as an infrared sensor, an inductive sensor, a capacitive sensor or photo corrector or the like.

Once again, the switch from the inactive state to the active state of said sensor can make it possible to open the electrical circuit as mentioned above or generate the sending of a signal to the control unit 12.

Independently of its design, this sensor 91 for detecting the angular position of the rotary winding member 10 of the link 5 is linked electrically to the control unit 12 and is configured to send to the control unit 12 an electrical signal as a function at least of the angular position of the rotary winding member 10 of the link 5 around said retaining system 6.

Note that, in the examples represented, the member 9 for detecting a deformation of the link 5 is configured so that, under the effect of a deformation of the link, it switches from an inactive state to an active state in an angular position of said rotary winding member 10 of the link other than the angular position or at least one of the angular positions of said rotary winding member 10 of the link 5 corresponding to an end-of-travel position of said rotary winding member 10 embodied by the stop 14. In other words, the member 9 for detecting a deformation of the link 5 detects an angular movement of the rotary member 10 and switches from the inactive state to the active state before the rotary winding member 10 of the link can move more angularly under the action of the stop 14.

Obviously, during this angular movement of the rotary winding member 10 of the link, there are many possible scenarios. Thus, an audible or visual alarm can precede the stopping of the movement of the platform 7 by deactivation of the controls 4, or not. Likewise, the alarm can be omitted. Finally, the detection of an angular movement of the rotary winding member 10 of the link by the member 9 for detecting a deformation of the link can take place at the very beginning of the angular movement travel of the rotary winding member 10 of the link or, for example, in the middle of this angular movement travel depending on the desired responsiveness.

In the examples represented, each of the retaining systems 6 comprises a rotary winding member 10 of the link around which the link is partially wound, and an elastic return member 11 formed by a spring 111 with which said rotary member 10 is equipped. The device 8 for detecting a deformation of the link 5 comprising a member 9 for detecting a deformation of the link 5 formed by a member 9 for detecting the angular position of the rotary winding member 10 of the link 5 equips just one of the retaining systems 6, called main retaining system 61. The stiffness of the spring 111 with which this main retaining system 61 is equipped is less than the stiffness of the spring 111 with which the other retaining system 6 is equipped.

The basket 1 also comprises a system 13 for resetting the operation of the control or controls 4 of the system 2 driving movement of the platform to the state in which the controls 4 are prevented from operating, this system 13 comprising a reset member 131 that can be actuated manually.

The operation of a basket 1 as described above works as follows: the retaining systems 6 are fixed to the platform 7 in a position in which the link 5 is in the taut state between the retaining systems 6 and forms a substantially horizontal line separating the space arranged above the control console 3 and the position 71 for receiving an operator 30 as illustrated in FIG. 1. In this position, the link 5 is kept taut under the action of the elastic return members 11.

On each retaining system 6, the stop 14 and in particular the post 141 constituting said stop, is arranged between the ends of the guiding path 142 formed on the rotary winding member 10 of the link 5 such that the rotary winding member 10 can be moved angularly in the clockwise or counter-clockwise direction.

The member 9 for detecting a deformation of the link 5 by detection of the angular position of the rotary winding member 10 of the link is in the inactive state. In the case of a detection member 9 of push-button type as represented, the moving part of the push button is housed in the notch formed on the perimeter of the wheel 101 constituting the rotary winding member 10 of the link 5 as described above.

Under the effect of a pressure applied to the link 5 and resulting from a movement of the operator toward the control console 3, the link 5 is deformed generally in the direction of an increase in the volume of the position 71 for receiving the operator 30. This deformation of the link by pressure on the link 5 drives an angular movement of the rotary winding members 10 of the link 5 against the action of the elastic return members 11 in the direction of unwinding of the link 5 of said rotary winding members 10 of the link 5.

In fact, at each of its ends, the link 5 pulls, under the effect of the pressure to which it is subjected, on the rotary winding member 10 of the link to which it is coupled by its end 51. This angular movement of the rotary winding member 10 of the link is detected by the member 9 for detecting a deformation of the link whose moving part is moved by bearing contact with the perimeter of the rotary winding member 10 of the link.

In fact, the perimeter of the rotary winding member 10 of the link in contact with the moving part of the member 9 for detecting a deformation of the link is no longer formed by the hollow of the notch but by the edges of the notch. The movement of this moving part of the detection member 9 corresponds to the switching of said member 9 for detecting a deformation of the link from an inactive state to an active state. This activation is detected by the control unit 12 which transmits a command signal to stop the operation of the controls 4 of the system 2 driving movement of the platform 7 and therefore stop movement of the platform 7. In parallel, a warning device, when present, can be activated, and an alarm can be issued.

The stopping of the movement of the platform 7 takes place before the rotary winding member 10 of the link 5 is in the end-of-travel position with respect to the stop 14. It is then possible for the operator to exert an additional pressure on the link 5 to generate an additional angular movement of the rotary winding members 10 of the link and free up a space between, for example, an obstacle 31 which might be pushing him or her in the back, and the link 5. The operator can then actuate the reset member 131 and once again control movement of the platform. This control allows the operator to disengage from the link. Once the link 5 is freed of any pressure from the operator, this link 5 reverts to its initial position and normal operation of the basket can resume.

The invention claimed is:

1. A basket comprising:

a platform having a position for receiving an operator, a system driving movement of the platform, a control console borne by the platform and equipped with at least one control of the system driving movement of the platform, that can be manually actuated, a flexible safety link, two systems for retaining the link, one arranged at one of the ends of the link, the other arranged at the other of the ends of the link, for keeping the link in at least one position in which the link extends across the platform and forms a demarcation line between a part of the position for receiving an operator of the platform and the control console, a device for detecting a deformation of the link comprising at least one member for detecting a deformation of the link, said detection member being configured so that, under the effect of a deformation of the link, it switches from an inactive state in which the operation of the control or controls of the system driving movement of the platform is not b prevented to an active state in which the operation of the control or controls is prevented, wherein at least one of the retaining systems comprises a rotary member for winding the link around which the link coupled to said rotary member is partially wound, said rotary member being equipped with at least one elastic return member of said rotary member configured to exert, on said rotary member, a force driving angular movement of the rotary member in the direction of winding of the link around said rotary member.

2. The basket as claimed in claim 1, wherein the or at least one of the members for detecting a deformation of the link is a member for detecting the angular position of the rotary winding member of the link of one of the retaining systems.

3. The basket as claimed in claim 1, wherein the basket comprises a control unit with which the device for detecting a deformation of the link is configured to communicate, this control unit being configured to transmit a command signal stopping the operation of the controls of the system driving movement of the platform as a function of the data received from the detection device.

4. The basket as claimed in claim 3, wherein the or at least one of the members for detecting a deformation of the link is a sensor for detecting the angular position of the rotary winding member of the link of one of the retaining systems by contact with said rotary winding member of the link or without contact, this sensor being linked electrically to the control unit and being configured to send to the control unit an electrical signal as a function at least of the angular position of the rotary winding member of the link of said retaining system.

5. The basket as claimed in claim 1, wherein the basket comprises a system for resetting the operation of the control or controls of the system driving movement of the platform, to the state in which the controls are prevented from operating, this system comprising a reset member that can be manually actuated.

6. The basket as claimed in claim 1, wherein the rotary winding member of the link of one of the retaining systems is a pulley wheel borne by a shaft arranged fixed on the platform, said pulley wheel having a rim configured to receive the link coupled by one of its ends to the wheel and in that the elastic return member of said rotary winding member is a spring.

7. The basket as claimed in claim 1, wherein the basket comprises a stop for limiting angular movement of the rotary winding member of the link of one of the retaining systems, said stop being configured to limit the angular movement of the rotary member beyond a predetermined movement travel, on the one hand in the state in which the rotary member is driven in the clockwise direction, and on the other hand in the state in which the rotary member is driven in the counter-clockwise direction.

8. The basket as claimed in claim 1, wherein, the basket comprising a stop for limiting angular movement of the rotary winding member of the link of one of the retaining systems, said stop being configured to limit the angular movement of the rotary member, at least in the link unwinding direction of said rotary member, beyond a predetermined angular movement travel of said rotary member, the member for detecting a deformation of the link is configured so that, under the effect of a deformation of the link, it switches from an inactive state to an active state in an angular position of said rotary winding member of the link other than the or at least one of the angular positions of said rotary winding member of the link corresponding to an end-of-travel position of said rotary winding member embodied by said stop.

9. The basket as claimed in claim 1, wherein, each of the retaining systems comprising a rotary winding member of the link around which the link is partially wound, and an elastic return member formed by a spring with which said rotary member is equipped, and the device for detecting a deformation of the link comprising a member for detecting a deformation of the link formed by a member for detecting the angular position of the rotary winding member of the link of just one of the retaining systems, called main retaining system, the stiffness of the spring with which this main retaining system is equipped is less than the stiffness of the spring with which the other retaining system is equipped.

10. The basket as claimed in claim 1, wherein the basket is an aerial basket.

* * * * *